(12) United States Patent
Kim et al.

(10) Patent No.: US 8,868,774 B2
(45) Date of Patent: Oct. 21, 2014

(54) METHOD AND APPARATUS FOR INTEGRATING AND MANAGING INFORMATION OF MOBILE TERMINAL

(75) Inventors: Yon-Hee Kim, Seoul (KR); Tae-Ho Oh, Seoul (KR); Young-In Cha, Seoul (KR); Gi-Seon Nam, Seongnam-si (KR); O-Hyon Kwon, Seoul (KR)

(73) Assignee: SK Planet Co., Ltd., Seoul (KR)

(*) Notice: Subject to any disclaimer, the term of this patent is extended or adjusted under 35 U.S.C. 154(b) by 1938 days.

(21) Appl. No.: 11/573,887

(22) PCT Filed: Aug. 18, 2005

(86) PCT No.: PCT/KR2005/002727
§ 371 (c)(1),
(2), (4) Date: Jan. 4, 2008

(87) PCT Pub. No.: WO2006/019276
PCT Pub. Date: Feb. 23, 2006

(65) Prior Publication Data
US 2008/0208950 A1    Aug. 28, 2008

(30) Foreign Application Priority Data

Aug. 19, 2004  (KR) .................. 10-2004-0065459
Aug. 24, 2004  (KR) .................. 10-2004-0066907
Aug. 24, 2004  (KR) .................. 10-2004-0066908
Sep. 3, 2004   (KR) .................. 10-2004-0070344

(51) Int. Cl.
G06F 13/00    (2006.01)
H04L 29/06    (2006.01)
H04L 29/08    (2006.01)
H04W 8/18     (2009.01)

(52) U.S. Cl.
CPC .............. *H04W 8/18* (2013.01); *H04L 65/80* (2013.01); *H04L 67/303* (2013.01); *H04L 29/06027* (2013.01)
USPC ........... 709/232; 709/233; 709/246; 709/227; 709/228

(58) Field of Classification Search
CPC . H04L 65/80; H04L 29/06027; H04L 67/303; H04W 8/18

USPC .................. 709/232, 233, 246, 227, 228
See application file for complete search history.

(56) References Cited

U.S. PATENT DOCUMENTS 6,076,109 A * 6/2000 Kikinis ..................... 709/228
6,199,099 B1 * 3/2001 Gershman et al. ........ 709/203

FOREIGN PATENT DOCUMENTS

CN    1516031    7/2004
JP    10-013940   1/1998

(Continued)

OTHER PUBLICATIONS

International Search Report for PCT application PCT/KR2005/002727, submitted May 3, 2010.

(Continued)

*Primary Examiner* — Kenneth Coulter
(74) *Attorney, Agent, or Firm* — Lowe Hauptman & Ham, LLP

(57) ABSTRACT

Disclosed is a method and apparatus for integrating and managing information of mobile terminal which provide content in accordance with an efficiency of a mobile terminal. Method comprises the steps of A) adjusting whether a mobile terminal supports a user agent profile and requesting an information of the mobile terminal; B) deciding an approval on the information of the mobile terminal after identifying a registration content of the information of the mobile terminal; C) extracting a subscriber information and a device ID from a log file generated in the case that the mobile terminal accesses a wireless internet network, comparing the same with pre-stored data and updating the subscriber information and the device ID in accordance with the result of the comparison; D) inquiring and requesting the information of the mobile terminal from a content providing unit based on the subscriber information in the case that the mobile terminal accesses the content providing unit through the wireless internet network; and (E) transmitting an inquiring result of the information of the mobile terminal to the content providing unit.

27 Claims, 16 Drawing Sheets

(56) References Cited

FOREIGN PATENT DOCUMENTS

| | | |
|---|---|---|
| KR | 1020000020433 | 4/2000 |
| KR | 1020010025696 | 4/2001 |
| KR | 1020030054104 | 7/2003 |
| KR | 1020040041341 | 5/2004 |
| KR | 1020040044657 | 5/2004 |

OTHER PUBLICATIONS

Korean Office Action for Korean application No. 10-2004-0066908, submitted May 3, 2010.

Chinese Office Action for Chinese application No. 2005800359155, submitted May 3, 2010.

* cited by examiner

Fig. 11

| HANDSET MANAGEMENT |
| --- |
| ⊞ HANDSET PROFILE INFO MANAGEMENT |
| ⊞ HANDSET URI RULE MANAGEMENT |
| ⊞ HANDSET PROFILE SCHEMA MGMT |
| ⊞ TERMINAL VENDOR MANAGEMENT |

VENDOR [ALL ▽]   MODEL [ ]   PHONE TYPE [ ]

BROWSER NAME [ ]   SOFTWARE NUMBER [ ]   [SEARCH]

→ TOTAL NUMBER OF SEARCH RESULT : 0                PAGE NUMBER(S) 1 OF 1

| NO | VENDOR | MODEL | URI | PHONE TYPE | UAP SUPPORT | BROWSER NAME | SOFTWARE NUMBER | DETAILED INFORMATION | MANAGEMENT |
|----|--------|-------|-----|------------|-------------|--------------|-----------------|----------------------|------------|

Fig. 13

HANDSET MANAGEMENT

⊞ HANDSET MANAGEMENT
· SEARCH HANDSET PROFILE
· CREATE HANDSET PROFILE

⊖ SEARCH HANDSET PROFILE

MODEL [          ]   PHONE TYPE [          ]   BROWSER NAME [          ]

SOFTWARE NUMBER [          ]   STATUS [WAITING ▽]   [SEARCH]

→ TOTAL NUMBER OF SEARCH RESULT : 1       PAGE NUMBER(S) 1 OF 1

| NO | MODEL | URI | BROWSER NAME | SOFTWARE NUMBER | APPROVED DATE | STATUS | DETAILED INFORMATION | MANAGEMENT |
|----|-------|-----|--------------|-----------------|---------------|--------|----------------------|------------|
| [1] |  |  |  |  |  |  |  |  |

Fig. 14

| HANDSET MANAGEMENT |
| ⊞ HANDSET PROFILE INFO MANAGEMENT |
| ⊞ HANDSET URI RULE MANAGEMENT |
| ⊞ HANDSET PROFILE SCHEMA MGMT |
| ⊞ TERRNINAL VENDOR MANAGEMENT |

* USER ID : [ ] [DUPLICATE CHECK]
* PASSWORD : [ ]
* VENDOR NAME : [ ]
* BUSINESS REGISTRATION NUMBER : [ ]
* CEO NAME : [ ]
* ADDRESS : [ ]
* TELEPHONE NUMBER : [ ]
* MANAGER'S NAME : [ ]
* MANAGER'S MOBILE PHONE NUMBER : [ ]
* MANAGER'S TELEPHONE NUMBER : [ ]
HOME PAGE URL : [ ]
USER DESCRIPTION : [ ]

[CREATE]

COMPONENT LIST CREATE COMPONENT

→ TOTAL NUMBER OF SEARCH RESULT : 5     PAGE NUMBER(S) 1 OF 1

| NO | COMPONENT NAME | COMPONENT CODE | DESCRIPTION | DETAILED INFORMATION | MANAGEMENT |
|----|----------------|----------------|-------------|---------------------|------------|
| 1 | HARDWARE PLATFORM | HW | DEVICE COMPONENT | SEE DETAIL ≫ | MODIFY DELDTE |
| 2 | SOFTWARE PLATFORM | SW | DEVICE COMPONENT | SEE DETAIL ≫ | MODIFY DELDTE |
| 3 | BROWSER UA | BR | HTML CLIENT COMPONENT | SEE DETAIL ≫ | MODIFY DELDTE |
| 4 | NETWORK CHARACTERISTICS | NC | NETWORK COMPONENT | SEE DETAIL ≫ | MODIFY DELDTE |
| 5 | WAP CHARACTERISTICS | WC | DEVICE WAP (WAP CLIENT) COMPONENT | SEE DETAIL ≫ | MODIFY DELDTE |

Fig. 16

DETAILED INFORMATION OF SCREENSIZE
ATTRIBUTE INFO

| | |
|---|---|
| COMPONENT CODE | HW |
| COMPONENT NAME | HARDWAREPLATFORM |
| SUBCOMPONENT CODE | |
| SUBCOMPONENT NAME | |
| ATTRIBUTE NAME | SCREENSIZE |
| NAME SPACE | PRF |
| DATA TYPE | DIMENSION |
| ATTRIBUTE TYPE | |
| AUTHORITIVE(Y/N) | N |
| RESOLUTION RULE | LOCKED |
| CASESENSITIVE(Y/N) | Y |
| BITMAPSEQ | 13 |
| MANDATORY(Y/N) | Y |
| DESCRIPTION | PIXEL DEVICE SCREEN SIZE. (WIDTH X HEIGHT) PHYSICAL SIZE. DISPLAY SIZE PHYSICAL SIZE. |

◁ BACK TO THE LISTS PAGE    [MODIFY]  [DELDTE]

HANDSET PROFILE

- ⊞ HARDWARE PLATFORM
  - BITS PER PIXEL
  - COLOR CAPABLE
  - CPU
  - DIGITAL CAMERA CAPABLE
  - IMAGE CAPABLE
  - INPUT CHAR SET
  - KEYBOARD
  - MODEL
  - [SCREEN SIZE]
  - SCREEN SIZE CHAR
  - VENDOR
  - VOICE INPUT CAPABLE
- ⊞ SOFTWARE PLATFORM
- ⊞ BROWSER UA

[ADD]

METHOD AND APPARATUS FOR INTEGRATING AND MANAGING INFORMATION OF MOBILE TERMINAL

CROSS REFERENCE TO RELATED APPLICATION

This application is the National Phase application of International Application No. PCT/KR2005/002727, filed Aug. 18, 2005, which designates the United States and was published in English. This application, in its entirety, is incorporated herein by reference.

TECHNICAL FIELD

The present invention relates to a telecommunication system for a wireless internet service, and more particularly to a method and apparatus for integrating and managing information of mobile terminal which provide content in accordance with an efficiency of a mobile terminal.

BACKGROUND ART

Generally, a content provider provides a mobile terminal with content selected by a user regardless of an efficiency of a mobile terminal in the case that the user accesses a wireless internet system and then requests contents. Namely, the contents provider provided the mobile terminal with contents regardless of whether how many colors are supported by the mobile terminal, how many chords are supported by the mobile terminal and are the software and the hardware, which game contents requested by a user of a mobile terminal can be performed by, supported by the mobile terminal.

According as the development of contents corresponding to an efficiency of a revolutionary development of a mobile terminal is actively processing on, contents providers have presented the necessity of discriminating contents provision in accordance with an efficiency of a mobile terminal.

In order to solve the problem, a terminal vendor stores and manages the information of a mobile terminal, and contents providers, who need the information of a mobile terminal, have utilized the information of a mobile terminal. However, there have been a variety of problems that an update of the information of a mobile terminal cannot be verified.

And also the information of a mobile terminal is updated through an commercial agent in the case that new subscribing and appliance modification through the commercial agent is performed in order for an update of the information of a mobile terminal. However, because a predetermined time was elapsed in order that the information of a mobile terminal compiled from the commercial agent is collected and then stored in a database, the problem has been generated which a service is not performed in the case that the subscriber accesses a wireless internet system using the mobile terminal during the predetermined time.

Contents provider ask the information of a mobile terminal to a Portal Platform performing an integrated management of a wireless internet when contents providers wish to provide a mobile terminal with contents through a wireless internet. At this time, the contents providers have asked by using a mobile terminal ID such as a URI (Unique Resource Identify), User Agent, Phone Type, etc.

But contents provider can not provide contents based on the information of a mobile terminal because in the case that contents provider can't and doesn't know the mobile terminal ID. Furthermore, the need is looming large that contents provider can also provide a user's mobile terminal with contents in the case that a user, who uses a voice communication through a mobile terminal but doesn't join a wireless internet service, wishes to use the wireless internet service.

DISCLOSURE OF INVENTION

Technical Problem

Accordingly, it is a first object of the present invention to provide a method and apparatus for integrating and managing information of mobile terminal enabling a wireless internet operator as well as a terminal vendor to register, modify and delete an information of a mobile terminal by managing the information of the mobile terminal for providing a user with a content in accordance with an efficiency of a mobile terminal, and moreover enabling the content provider to simply inquire an efficiency of the mobile terminal used by a service subscriber.

Technical Solution

It is a first aspect of the present invention to provide a method for integrating and managing information of mobile terminals comprises the steps of: A) adjusting whether a mobile terminal supports a user agent profile and requesting an information of the mobile terminal; B) deciding an approval on the information of the mobile terminal after identifying a registration content of the information of the mobile terminal; C) extracting a subscriber information and a device ID from a log file generated in the case that the mobile terminal accesses a wireless internet network, comparing the same with pre-stored data and updating the subscriber information and the device ID in accordance with the result of the comparison; D) inquiring and requesting the information of the mobile terminal from a content providing unit based on the subscriber information in the case that the mobile terminal accesses the content providing unit through the wireless internet network; and (E) transmitting an inquiring result of the information of the mobile terminal to the content providing unit.

It is a second aspect of the present invention to provide a method for integrating and managing information of mobile terminals comprises the steps of: Ga) receiving a log file generated by accessing a wireless internet network by the mobile terminal; Na) extracting a subscriber information and a device ID from a log file; Da) discriminating whether the subscriber's information exists in a first database managing a subscriber joined a wireless internet service; Ra) storing the device ID to a second database by mapping the device ID with the subscriber's information in the case that the subscriber's information doesn't exist in a first database; Ma) inquiring the stored device ID corresponding to the subscriber's information in the second database managing the information of the mobile terminal in the case that the subscriber's information exists in a first database; and Ba) performing an update of the device ID in the case that the device ID stored the second database is not identical to the device ID extracted from the log file.

It is a third aspect of the present invention to provide a method for integrating and managing information of mobile terminals comprises the steps of: i) generating a terminal information inquiry request message of a mobile terminal receiving a content using a subscriber information obtained by accessing a WAP or a phone number of the subscriber's mobile terminal; ii) receiving the terminal information inquiry request message by a content provider access unit; iii) discriminating an availability of a data format included in the terminal information inquiry request message and an availability of the content provider's authority; iv) transmitting the terminal information inquiry request message to a terminal information management unit in case of being available in the discriminating result of the step (iii); iv) checking a phone number of the mobile terminal or a subscriber information corresponding to a client ID in the terminal information management unit, and in the case that the subscriber information exists, checking an information of the mobile terminal corresponding to the subscriber information; and (v) checking an information of the mobile terminal corresponding to the subscriber information and transmitting a response message changing into a predetermined format an information in accordance with the checking result to the content provider access unit.

It is a fourth aspect of the present invention to provide an apparatus for integrating and managing information of mobile terminals comprises: a subscriber information detection unit for obtaining a subscriber information of a mobile terminal receiving a content through a communication network; a content provider access unit for receiving a terminal information inquiry request message in order to inquire an information of the subscriber's terminal based on subscriber information and discriminating its availability, and transmitting the received information of the subscriber's terminal to a content providing unit; and a terminal information management unit for managing a terminal information corresponding to the subscriber information, reading the terminal information and then transmitting the same to the content provider access unit in the case that the terminal information inquiry request message is available.

Advantageous Effects

As described above, the present invention performs a service smoothly in the case that a subscriber accesses a wireless internet system by a mobile terminal during a predetermined time elapsed in order that an operator stores an information of the mobile terminal of the subscriber joining the wireless internet system. namely, the present invention updates whether any subscriber uses any mobile terminal at a predetermined database, and thus can provide a user with a content in accordance with an efficiency of a mobile terminal in a wireless internet system.

Also, in accordance with the present invention, a client, who uses a mobile terminal but doesn't join a wireless internet system, presents or transmitting contents to the mobile terminal by accessing the wireless internet system through a wire communication.

An also, in accordance with the present invention, a handset ID such as a URI (Unique Resource Identify), a user agent and a type of a mobile terminal can be inquired and also an information of the mobile terminal can be inquired by using a phone number of a subscriber's terminal or a client ID adjusted by a subscription in case of inquiring the information of the mobile terminal.

Accordingly, the present invention can also provide contents based on an information of a mobile terminal at any time because an operator can inquire the information of the mobile terminal in the case that the operator doesn't and can't know the handset ID of the mobile terminal.

Moreover, in accordance with the present invention, an operator directly generates and manages an information of a mobile terminal, and even though a terminal vendor generates the information of the mobile terminal, more accurate and reliable database can be provided by performing an approval process on the generated information of the mobile terminal.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIGS. 9 through 16 illustrate a web page for integrating and managing an information of a mobile terminal in accordance with an embodiment of the present invention.

Figure 1:
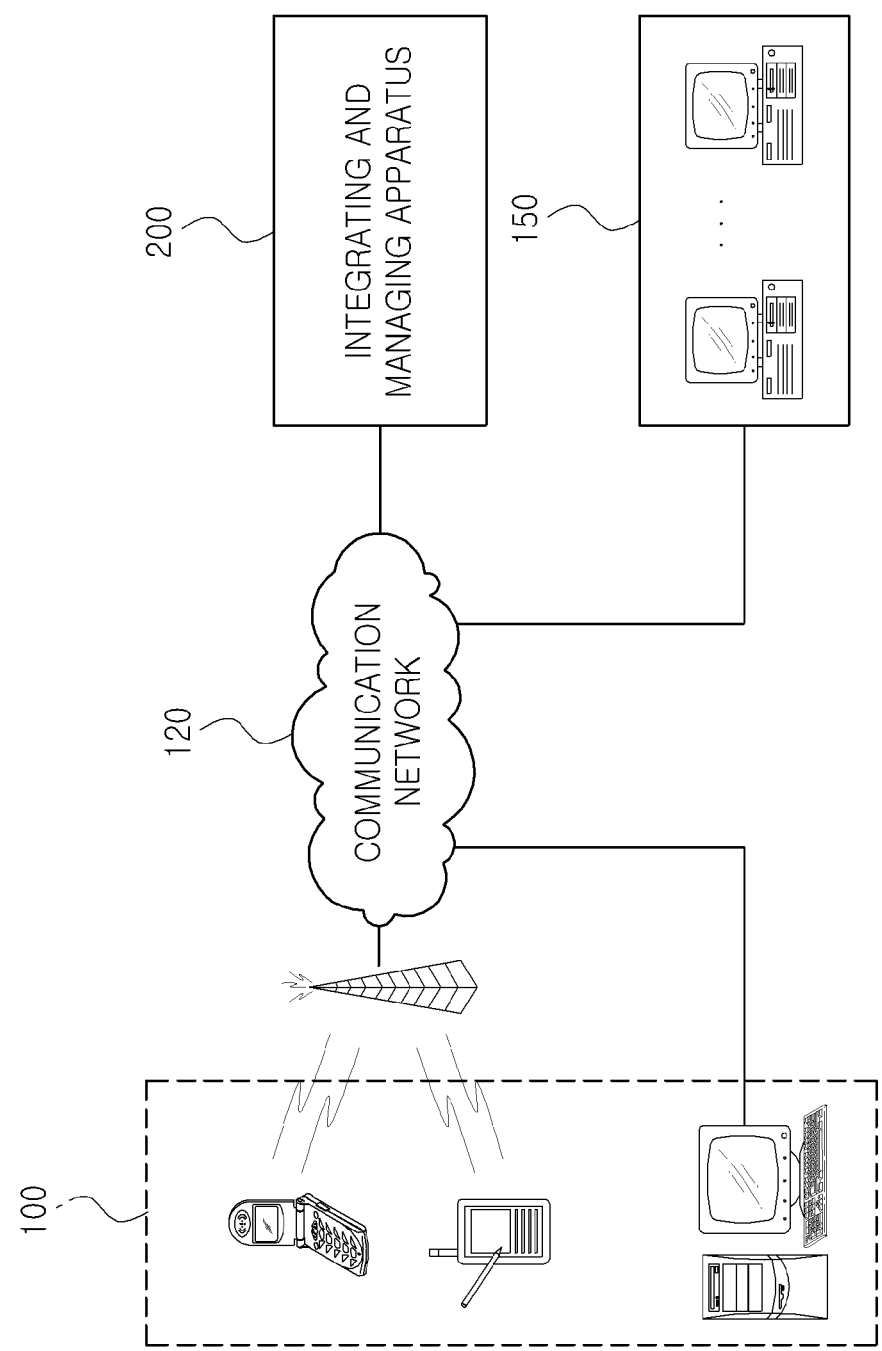
FIG. 1 is a block diagram of a system for servicing contents applied on an embodiment of the present invention in accordance with an formation of a mobile terminal.

The following Examples are given for the purpose of illustration only and are not intended to limit the scope of this invention.

BEST MODE FOR CARRYING OUT THE INVENTION

Hereinafter, preferable embodiments according to the present invention will be described with reference to the accompanying drawings. Here, when one element is connected to another element, one element may be not only directly connected to another element but also indirectly connected to another element via another element. Further, irrelative elements are omitted for clarity. Also, like reference numerals refer to like elements throughout.

Referring to FIGS. 1 to 9c, a preferable embodiment that easily embodied by a person having ordinary skill in the same art that belongs to the present invention will be described in more detail.

FIG. 1 is a block diagram of a system for servicing contents applied on an embodiment of the present invention in accordance with information of a mobile terminal.

Referred to FIG. 1, a mobile communication system in accordance with the present invention comprises a communication network 120 and an integrating and managing apparatus 200, in another embodiment, further comprises a subscriber's terminal 100, a content providing unit 150 and an external server 170.

The communication network 120 includes a wire network and a wireless network, and respectively connects the subscriber's terminal 100, the content providing unit 150 and the external server 170.

The subscriber's terminal 100 includes a cellular phone performing a wireless communication, a mobile communication terminal including a PDA and a computer performing a wire communication.

The subscriber's terminal 100 in accordance with an formation of a mobile terminal is a mobile terminal, the subscriber's terminal 100 will be explained by limiting to a mobile terminal for the convenience of a following explanation and reference numerals of mobile terminal is identically disclosed. However, the subscriber's terminal 100 is not limited to a mobile terminal.

Content providers in accordance with the present invention is an operator who wishes to provide the subscriber's terminal 100 with a service including an application program and contents composed of various data.

The integrating and managing apparatus 200 has an open framework including a content provider access unit, a central management unit, a transmission unit and an interface unit, and thus is a portal platform having adaptability and a modularity, which can be embodied together with another solution.

Also the integrating and managing apparatus 200 supports a worldwide standard related to a wireless business such as a WAP (Wireless Application Protocol).

And also the integrating and managing apparatus 200 enables the content provider to rapidly start a service by integrating and managing a data in accordance with the content provider, a service and contents of the content provider and a menu of the content provider. Moreover, the integrating and managing apparatus 200 provides an authority model based on a service based subscription and CP (Content Provider) policy.

The integrating and managing apparatus 200 provides a search engine for a mobile terminal and a web page so as to perform a search using a code and a search in accordance with a keyword by a subscriber's mobile terminal.

The content providing unit 150 is endowed with an account from the integrating and managing apparatus 200 through the communication network 120 and registers a service to be provided to the subscriber's terminal 100. At this time, the integrating and managing apparatus 200 enables the content providing unit 150 to provide the subscriber's terminal 100 with a service. Namely, the integrating and managing apparatus 200 performs a total management for providing contents.

The integrating and managing apparatus 200 is connected with the external server 170, and the external server 170 includes an accounting server and a subscriber management server, etc.

Figure 2:
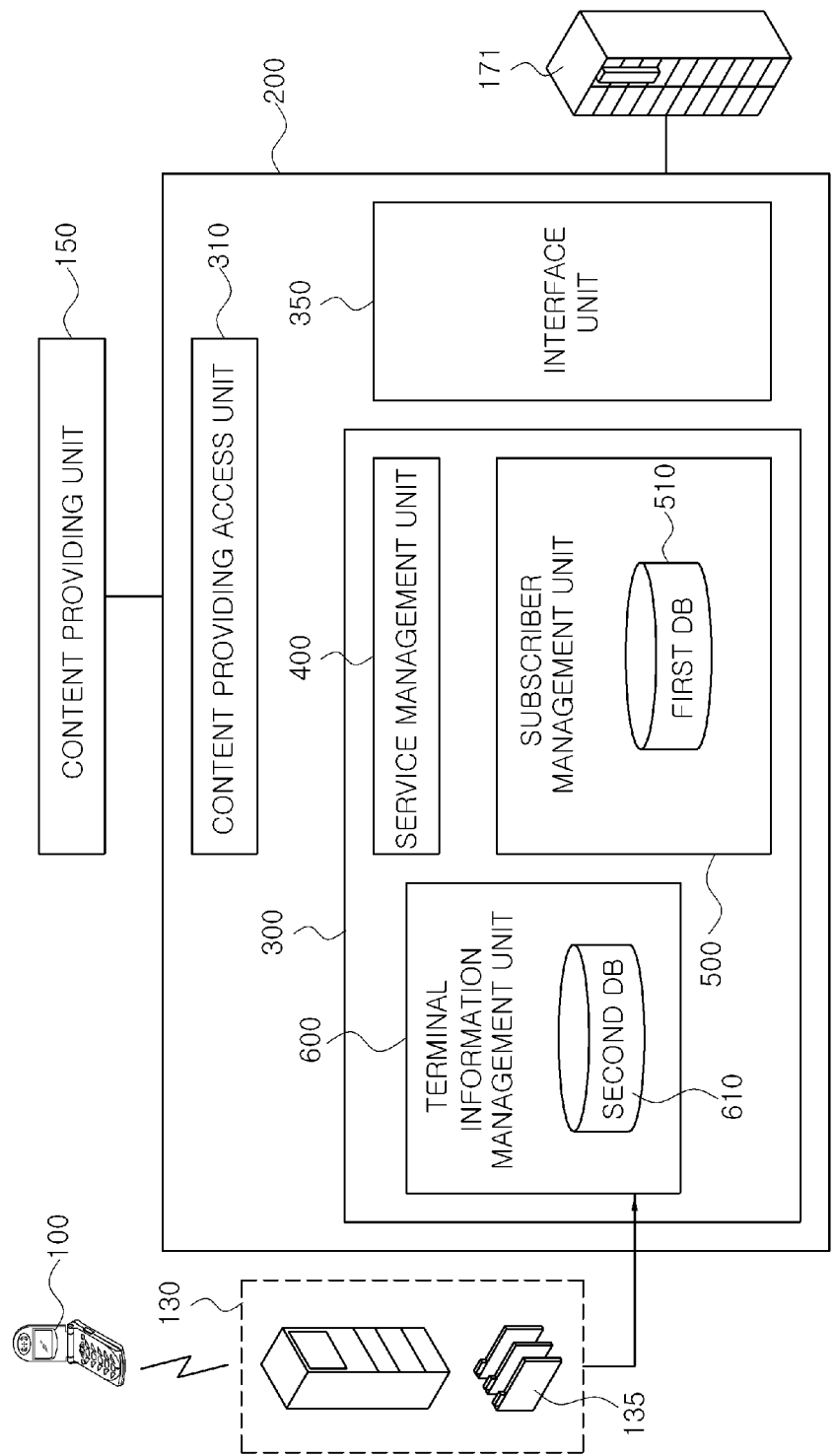
FIG. 2 is a simplified block diagram of an integrating and managing apparatus in accordance with an embodiment of the present invention.

FIG. 2 is a simplified block diagram of an integrating and managing apparatus in accordance with an embodiment of the present invention As depicted in FIG. 2, the integrating and managing apparatus 200 comprises a content provider access unit 310, a central management unit 300, a subscriber information detection unit 330 and an interface unit 350.

The subscriber information detection unit 330 detects subscriber information of the mobile terminal 100 accessing the integrating and managing apparatus 200 through a wireless network. Also the subscriber information detection unit 330 requests a subscriber information of another mobile terminal, namely a phone number to a user, receives the phone number inputted by the user and transmits the same to the content providing unit 150 in the case that a user, who accesses the integrating and managing apparatus 200 through a wire network, wishes to transmit a predetermined contents to another mobile terminal.

Because the phone number is necessary for providing a service by a content provider, the content providing unit 150 inquires to and accesses the content provider access unit 310 using the received phone number.

The content provider access unit 310 receives a terminal information inquiry request message from the content providing unit 150. The terminal information inquiry request message is a predetermined message for inquiring information of the mobile terminal 100 based on a subscriber information.

The content provider access unit 310 discriminates whether the terminal information inquiry request message is available and transmits the information of the mobile terminal 100 to the content providing unit 150.

Also the central management unit 300 comprises a service management unit 400, a subscriber management 500 and a terminal information management unit 600.

Herein, the service management unit 400 of the central management unit 300 manages authority information of a content provider. Additionally speaking, the service management unit 400 comprises CP (Content Provider) management database 402 for managing content providers and CP (Content Provider) authority database for managing the authority information of a content provider.

Accordingly, the service management unit 400 provides the content provider access unit 310 with an authority information of a content provider in order to discriminate whether the content provider has a due right in the case that the content providing unit 150 inquires an information of the mobile terminal 100.

The subscriber management 500 is connected with a provisioning system 171 through the interface unit 350. The provisioning system 171 stores a phone number MIN (Mobile Identification Number; referred to as "MIN" hereinafter) or MDN (Mobile Directory Number; referred to as "MDN" hereinafter) of a wireless communication network subscriber and/or a wireless internet subscriber, a client ID and a phone type of a subscriber to thereby periodically transmit the same to a first database 510 of the subscriber management 500 through the interface unit 350.

The subscriber management 500 endows a subscriber information composed of any one of a MIN, a MDN and a client ID with a service management code having one to one correspondence by interlocking with the provisioning system 171 and stores the same at predetermined database.

Accordingly, even though any one of the MIN, the MDN and the client ID is inputted, if a database stored at the subscriber management 500 is used, a conversion into a service management code corresponding to a subscriber information is possible.

Also the subscriber management 500 comprises a subscriber joining a wireless communication network, a first database for managing information of a subscriber joining a wireless internet service as well as a wireless communication network and a database (not shown) for managing an information of a subscriber joining a mobile telephone network.

Accordingly, terminal information management unit 600 interlocks with the subscriber management 500, maps with a terminal information in accordance with a subscriber and thus manages the same.

Figure 3:
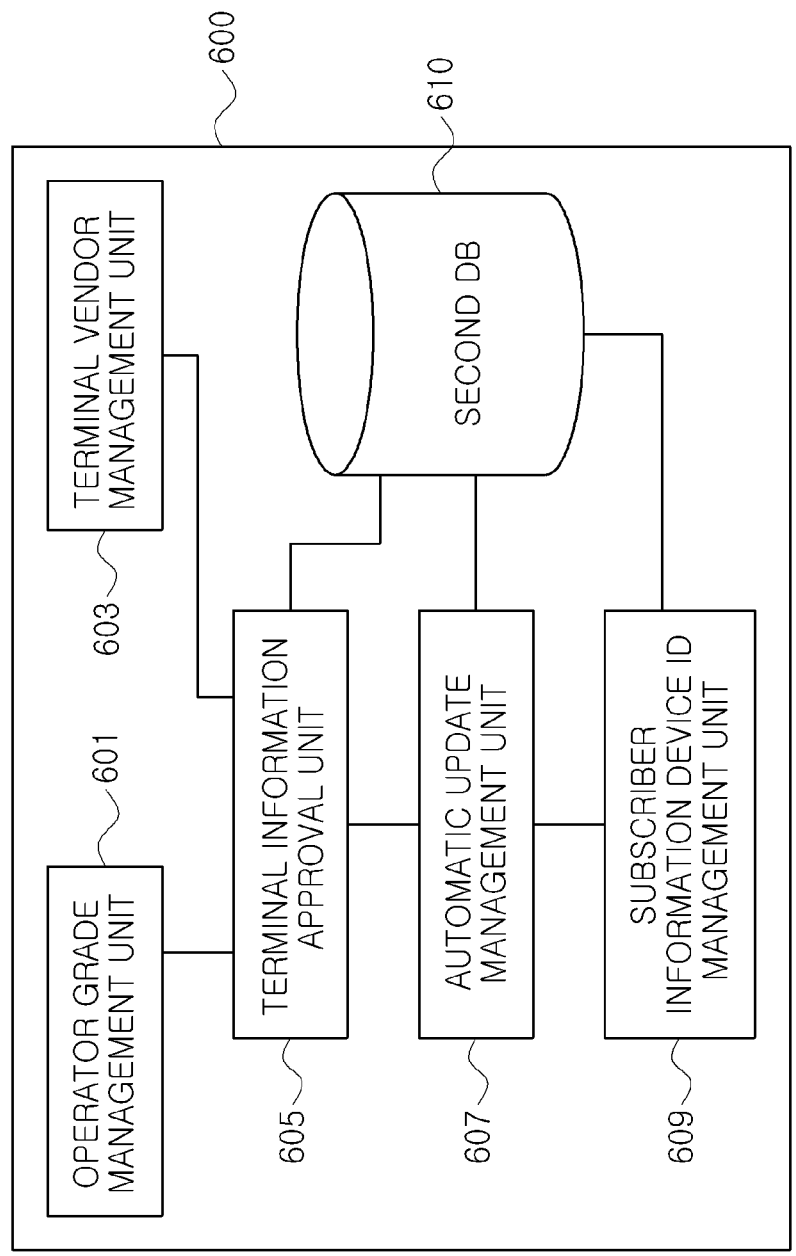
FIG. 3 is an interior block diagram of a terminal information management unit in accordance with an embodiment of the present invention.

As depicted in FIG. 3, terminal information management unit 600 comprises a operator grade management unit 601, a terminal vendor management 603, a terminal information approval unit 605, an automatic update management unit 607, a subscriber information-device ID management unit 609 and a second database 610.

Herein, a service management code, a subscriber information corresponding to the service management code and terminal information corresponding the subscriber information is stored at the second database 610.

Desirably, the terminal information management unit 600 comprises a database (not shown) in which the subscriber information corresponding to the service management code is adjusted and a database (not shown) in which the terminal information corresponding the subscriber information is stored.

The subscriber information matches a predetermined code with a URI (User Resource Identify; referred to as "URI" hereinafter), a user agent and a phone type, and a URI, a user agent and a phone type corresponding to an identical subscriber is matched with one code.

Referred to FIG. 3, an operator and a terminal vendor can register information of the mobile terminal 100, and an operator having a predetermined authority approves the registered information of the mobile terminal and then stores the same at a second database 610.

Accordingly, the terminal information management unit 600 comprises a operator grade management unit 601 for managing a grade of an operator and a terminal vendor management 603 for managing an information of a terminal vendor having an endowed account.

The terminal information approval unit 605, an operator having an authority warranted in accordance with a predetermined regulation decides whether the information of a mobile terminal is available concerning a registration request of terminal information according to an operator or a terminal vendor. The approved the information of a mobile terminal is stored at a second database 610.

A registration request of the mobile terminal is performed by receiving an information concerning whether the mobile terminal supports a UA profile by an operator and requesting a registration of the generated RDF (Resource Description Framework) file.

The RDF file is formed as a structure such as a component and an attribute or as a structure such as a component, a sub-component and an attribute. Also the content of the information of a mobile terminal follows a form defined at a schema of the RDF file.

The automatic update management unit 607 extracts a subscriber information and a device ID using a log file, compares the same with a pre-stored data and then updates the subscriber information and the device ID in accordance with the comparison result. Herein, the log file is generated at a web gateway 130 and is periodically transmitted to the terminal information management unit 600 in the case that the mobile terminal 100 accesses a wireless internet network.

The subscriber information-device ID management unit 609 manages the subscriber information and the device ID updated from the automatic update management unit 607. Also the subscriber information-device ID management unit 60 searches an information of the mobile terminal 100, reads a device ID corresponding to the subscriber information and transmits the same to the content providing unit 150 in the case that an information of the mobile terminal 100 is requested based on the subscriber information from the content providing unit 150.

The information of the mobile terminal 100 comprises any one of the hardware of a mobile terminal inputted by a terminal vendor, the software related information stored at an inside of the mobile terminal and a handset platform.

An operation of the present invention composed as mentioned above will be explained.

Figure 4:
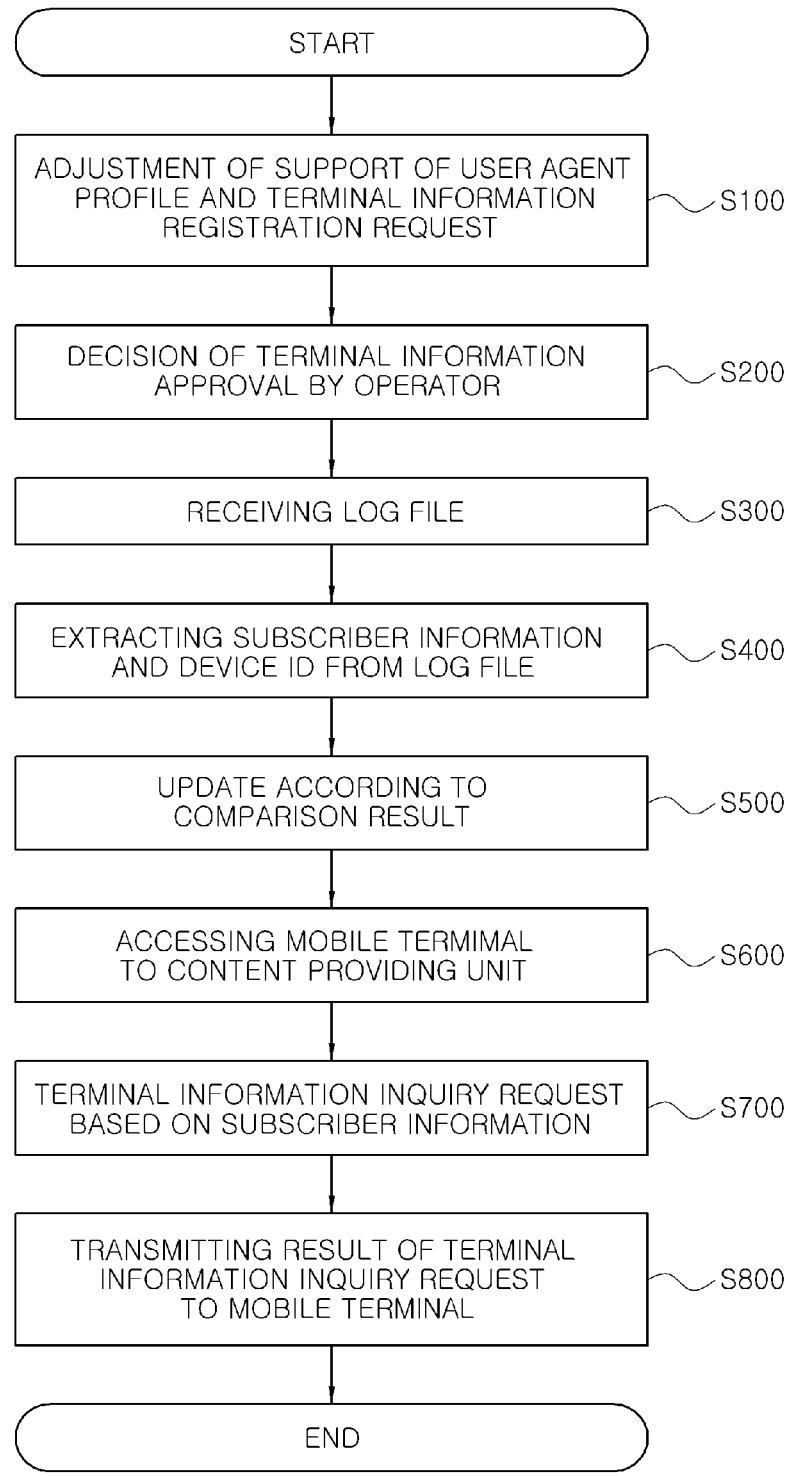
FIGS. 4 through 8 are a flow chart illustrating a method for integrating and managing an information of a mobile terminal in accordance with an embodiment of the present invention.

FIG. 4 is a flow chart illustrating a method for integrating and managing information of a mobile terminal in accordance with an embodiment of the present invention.

Referred to FIG. 4, an operator or a terminal vendor selects whether a mobile terminal supports an user agent profile which is a terminal information standard prescribed in an OMA (Open Mobile Alliance; referred to as "OMA" hereinafter), and then requests an information registration of the mobile terminal 100 or an update of the terminal information (S100).

If a request message corresponding to the information registration of the mobile terminal 100 requested by the operator or the terminal vendor or an update of the terminal information is received, an operator having an endowed authority in accordance with a predetermined regulation identifies a content of the terminal information and then decides whether the operator approves the terminal information (S200).

If an approval on the terminal information is completed, a URI corresponding to the terminal information is automatically generated.

Also the terminal information management unit 600 receives a log file generated from a web gateway and transmitted periodically, desirably at a real time in the case that the mobile terminal accesses a wireless internet network (S300).

A subscriber information and a device ID are extracted from the log file, are compared with a pre-stored data and updates a unidentified data, namely a subscriber information and/or a device ID in accordance with the comparison result (S400, S500).

The content providing unit 150 requests an inquiry about the information of the mobile terminal 100 based on the subscriber information to the integrating and managing apparatus 200 in the case that the mobile terminal 100 accesses the content providing unit 150 through the web gateway 130 so as to download contents (S600, S700).

The terminal information management unit 600 of the integrating and managing apparatus 200 stores a subscriber information and a device ID corresponding to the subscriber information. Accordingly, the terminal information management unit 600 inquires a terminal information based on the subscriber information in response with a terminal information inquiry requested from the content providing unit 150, and then transmits the inquiring result to the content providing unit 150 (S800).

Figure 5:
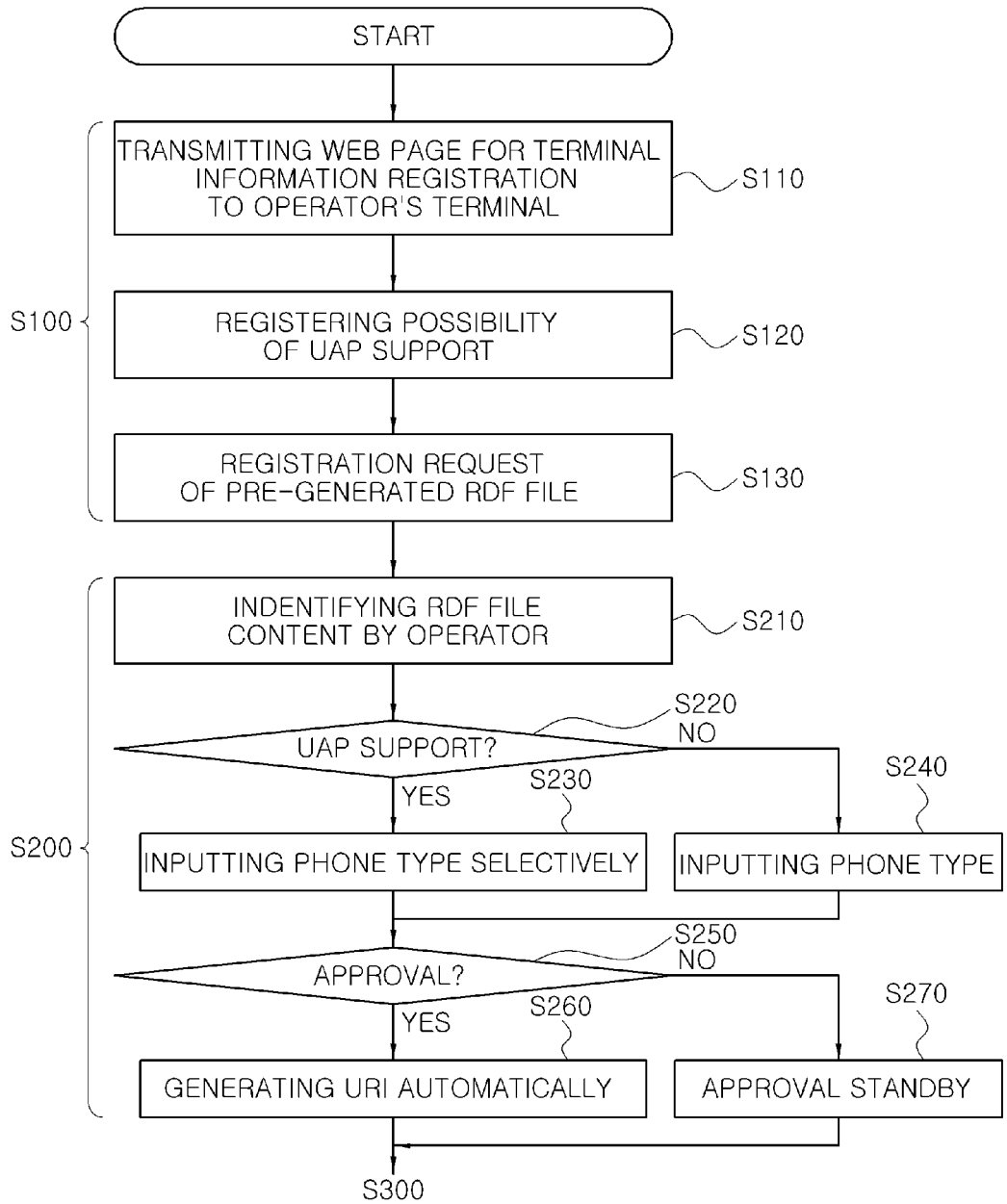

FIG. 5 is a flow chart for illustrating the steps of S100 and S200 registering and approving a terminal information in accordance with an embodiment of the present invention. Also FIGS. 9 through 11 respectively illustrate a web page for managing an information of a mobile terminal by an operator in accordance with an embodiment of the present invention, FIGS. 12 through 14 respectively illustrate a web page for managing an information of a mobile terminal by a terminal vendor in accordance with an embodiment of the present invention.

In accordance with a subject registering the terminal information, a first applied example that an operator registers the terminal information and a second applied example that a terminal vendor registers the terminal information.

In accordance with the first applied example, the terminal information management unit 600 transmits a web page for registering terminal information to the operator's terminal in the case that an operator wishes to register terminal information using his/her terminal (S110).

A mobile terminal, which an operator wishes to register terminal information through the web page, registers whether the mobile terminal supports a user agent profile and requests a registration of pre-generated RDF file to the terminal information management unit 600 (S120, S130).

The user agent profile, the RDF file and a schema of the RDF file follow a standard defined in a OMA.

Terminal information pre-generated by the operator is generated as the RDF file.

The RDF file is embodied as a component and an attribute, which is a high layer of the component. In another applied example, the RDF file is embodied as a component, a sub-component and an attribute, which is a high layer of the sub-component. Besides, another element, which is able to define a schema of the RDF file, includes a data type and a name space defined by a User Profile Standard. Respective elements of the RDF file are analyzed and are respectively stored at a database.

FIG. 15 shows an exemplary web page for illustrating components included in the RDF file. Also FIG. 16 shows an exemplary web page for illustrating an attribute list included in a hardware platform, which is a component, and illustrating a schema of a screen size, which is an attribute.

In accordance with a second applied example, a method, which a terminal vendor registers a terminal information to the terminal information management unit 600, will be explained hereinafter.

The terminal vendor requests a terminal information management unit 600 to generate an account for registering information of the mobile terminal.

Only terminal vendor having the generated account can update terminal information by accessing the terminal information management unit 600 through a communication network. Accordingly, the terminal information management unit 600 transmits the web page to a terminal of the terminal vendor in the case that the terminal vendor transmits a request message that the terminal vendor wishes to register a terminal information to the terminal information management unit 600.

Herein, the terminal vendor has to be in LOG ON state on its account.

Figure 12:
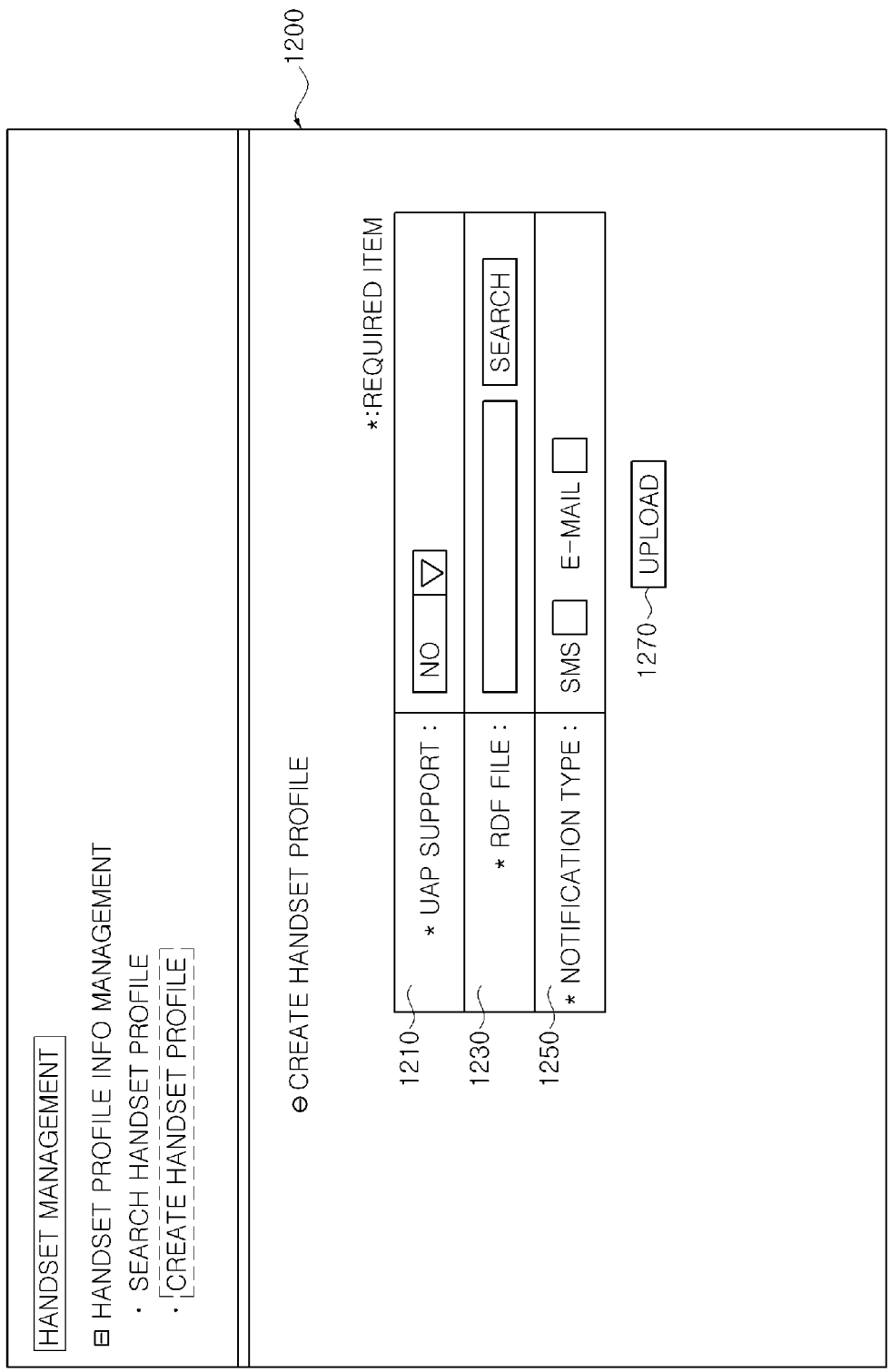

Terminal information is uploaded through the web page for the terminal vendor and a registration request message of the terminal information is received to the terminal information management unit 600 (See a web page in FIG. 12).

Following process is identical to the steps of S120 and S130.

Additionally speaking, the terminal vendor inquires information of a terminal, which the terminal vendor itself registers through a web page as depicted in FIG. 13. In addition, the terminal vendor can inquire or modify using a web page as depicted in FIG. 14 in the case that the terminal vendor wishes to inquire or modify its account information.

Modification content is reflected after an approval of an operator having the authority is completed in the case that the terminal vendor modifies its account.

A registration and an upgrade of terminal information by the operator or the terminal vendor is performed by following an approval process on the terminal information in accordance with a predetermined regulation.

At first, the operator identifies a content of the terminal information for an approval on the terminal information and discriminates whether the mobile terminal supports a user agent provided in an OMA (S210, S220). Herein, a content of the terminal information, as an external structure of the RDF file, refers to a component, a sub-component and an attribute.

As the discriminating result of the step of S220, in the case that the mobile terminal 100 doesn't support a user agent profile, a phone type, which is one example of a terminal identifier defined by a wireless internet operator or a wire service, is inputted and in the case that the mobile terminal 100 supports a user agent profile, the phone type is selectively inputted (S230, S240).

Figure 9:
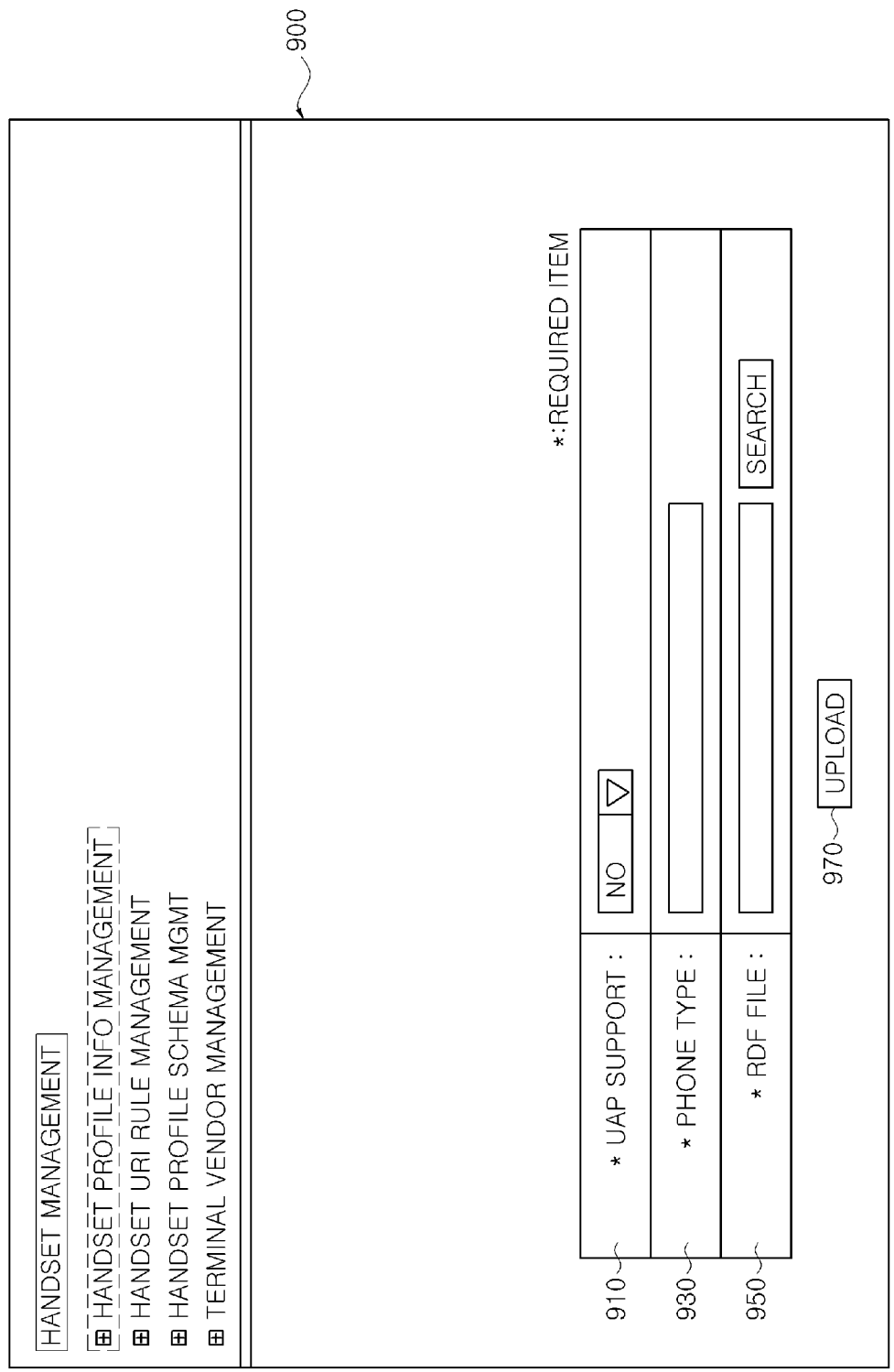

Registration information inputted to the web page is on [approval standby (Writing)] state in case of being approved by an operator having the authority after an [upload (970)] icon of a web page depicted in FIG. 9 is selected. Accordingly, an operator having the authority approves or reserves registration information on [approval standby (Writing)] state 1030 that an approval is not performed through a web page 1000 depicted in FIG. 10. Herein, if an operator having the authority completes an approval, a URI is automatically generated (S260).

Figure 10:
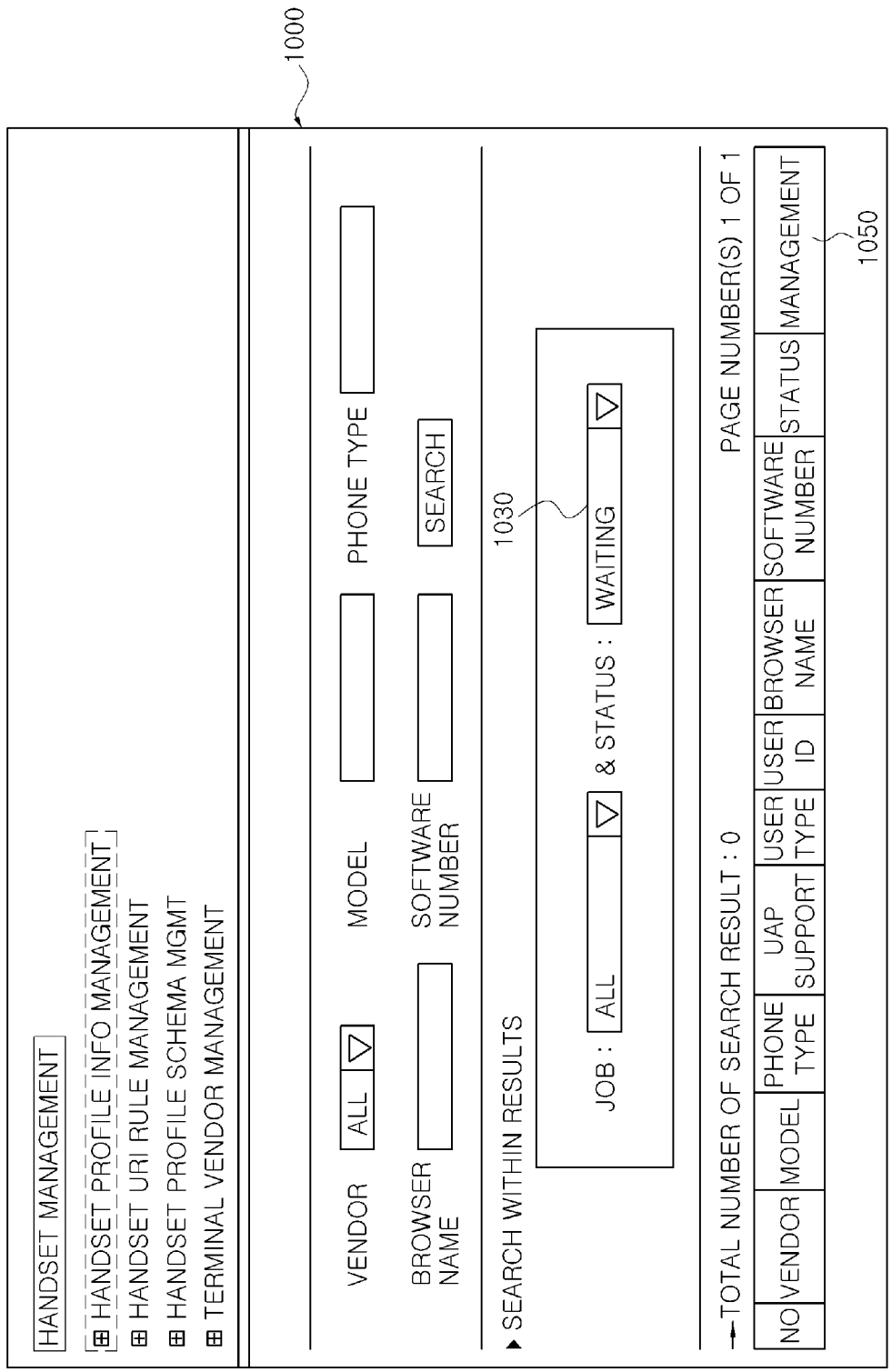

In addition, a modification request and a delete request of information of a mobile terminal as well as an approval on the information of the mobile terminal registered newly through a web page 1000 depicted in FIG. 10 are also performed.

An operator searches information of a terminal that is in the process of waiting or is approved through a web page depicted in FIG. 11

Figure 6:
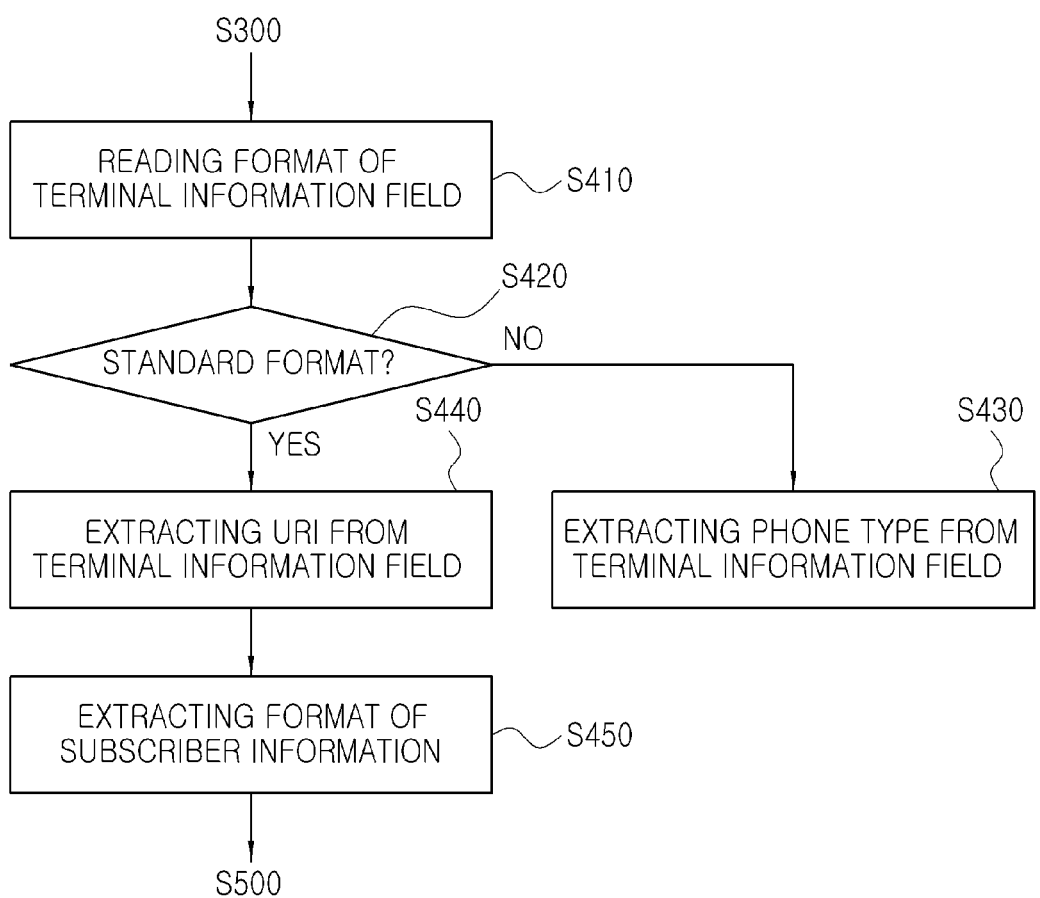

FIG. 6 illustrates a process extracting a subscriber information and a device ID from a log file in accordance with an embodiment of the present invention.

The terminal information management unit 600 reads a format of a terminal information field included in the log file and discriminates whether the terminal information field is a standard format (S410, S420).

The terminal information field is information of a terminal itself that is built-in the mobile terminal 100. Additionally speaking, a user agent profile that is specified in an OMA and a user agent, which respective wire services specify with itself before the OMA, specifies a standard exists in the terminal information field. A phone type is one example of a terminal identifier defined by the wire service or an operator of a wireless internet.

Accordingly, a user agent or a phone type is extracted from the terminal information field in the case that the terminal information field is not a standard (S430).

But a URI, which is one of a device ID, is extracted from the terminal information field in the case that a format of the terminal information field is a standard adjusted in an OMA. The device ID is information of a mobile terminal including a URI, a user agent and a phone type.

Also the terminal information management unit 600 reads a format of subscriber information including the log file (S450).

Figure 7:
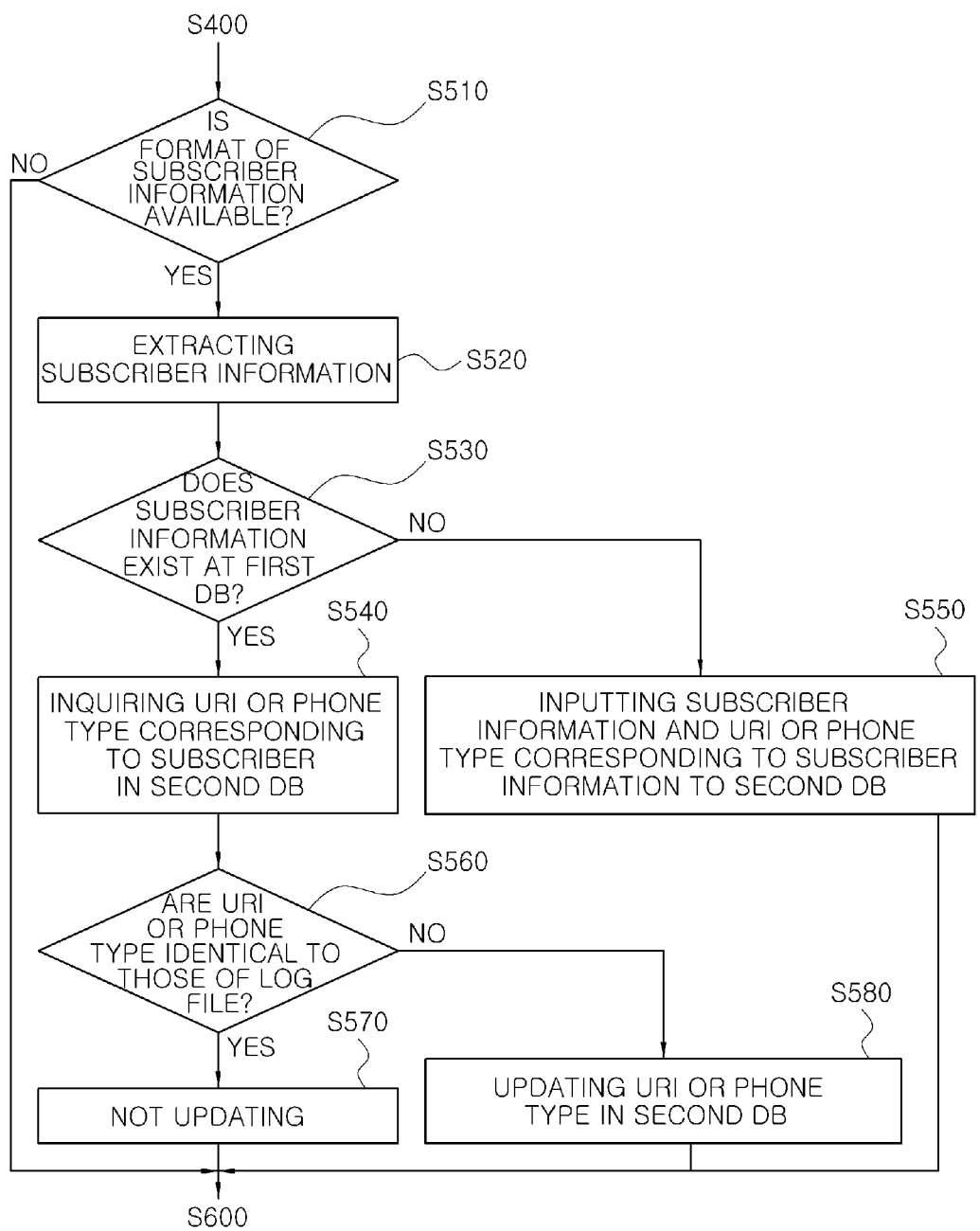

FIG. 7 illustrates a process updating terminal information using a subscriber information and a device ID extracted from the step of S400 in accordance with an embodiment of the present invention.

Namely, the terminal information management unit 600 discriminates whether a subscriber information and a device ID extracted from the log file are available (S510).

An automatic updating of the present invention is not performed in the case that a subscriber information and a device ID extracted from the log file are not available. However, the terminal information management unit 600 extracts subscriber information from the log file in the case that a format of the subscriber information is available (S520).

The terminal information management unit 600 discriminates whether the subscriber information exists at a first database 510 interlocking with the subscriber management unit 500 (S530).

In another applied example, the terminal information management unit 600 filters an information which is necessary in the terminal information management unit 600 of information of a subscriber joining a wireless network, stores the filtered information to a predetermined database and then manages the same.

The terminal information management unit 600 maps the subscriber information with the device ID extracted from the log file and then stores the same to a second database 610 of the terminal information management unit 600 in the case that a subscriber's phone number doesn't exists at the first database 510 in the discriminating result of the step of S530 (S550).

But the terminal information management unit 600 inquires whether an information identical to a URI or a phone type of a mobile terminal extracted from the log file exists at the second database 610 in the case that a subscriber's phone number exists at the first database 510 in the discriminating result of the step of S530 (S540).

An update is not necessary in the case that an identical information exists at the first database 510 in the inquiring result of the step of S540, but the terminal information management unit 600 maps the subscriber information with a terminal information and stores the same to a second database 610 of the terminal information management unit 600 in the case that an identical information, namely a URI and a phone type of a mobile terminal don't exist at the first database 510 (S560, S570, S580).

Figure 8:
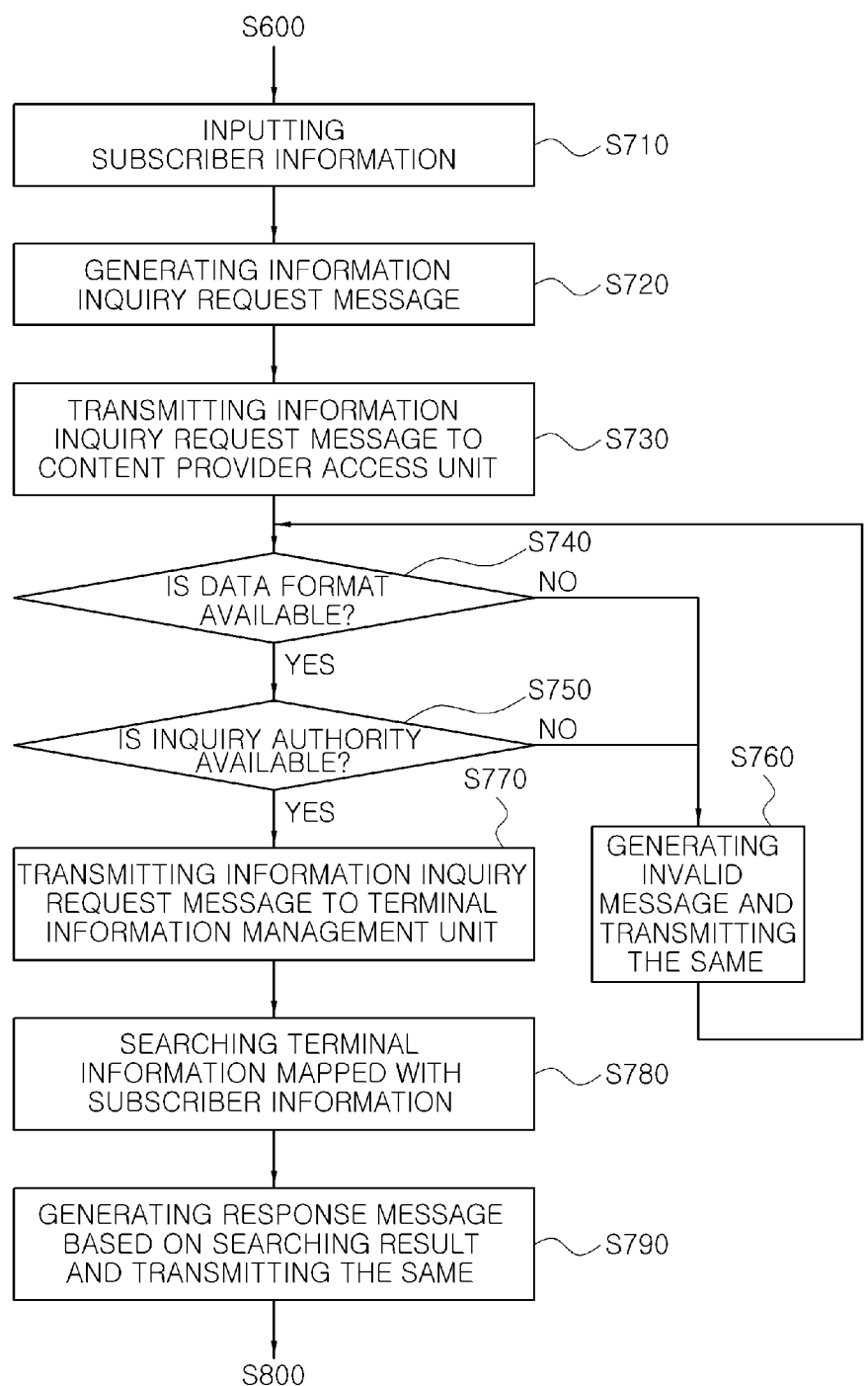

FIG. 8 illustrates process requesting terminal information based on a subscriber information in accordance with an embodiment of the present invention.

Namely, the content providing unit 150 can identify a subscriber information or a device ID through a message transmitted in case of a user's access in the case that that the mobile terminal 100 requests contents to the content providing unit 150. The content providing unit 150 transmits a terminal information inquiry request message to the integrating and managing apparatus 200 using the subscriber information or the device ID (S710).

The subscriber information is an identifier for uniquely identifying a wireless internet subscriber, and includes an MIN and an MDN of a subscriber's terminal and a client ID (defined in a OMA).

In one applied example, a user selects a content of a bell sound to be transmitted and inputs a phone number of friend's terminal to a web page in the case that a subscriber accessing the integrating and managing apparatus 200 by a wire presents his/her friend having a mobile terminal with a bell sound. Herein, the content providing unit 150 transmits a terminal information inquiry request message to the integrating and managing apparatus 200 using the phone number of friend's terminal.

The generated terminal information inquiry request message is inputted to the content provider access unit 310 (S730).

The content provider access unit 310 discriminates whether a data format included in the terminal information inquiry request message is available (S340). Also the content provider access unit 310 discriminates whether the content providing unit 150, which transmits the terminal information inquiry request message, has a due right and inquires (S750).

In the case that a data format or an authority of a content provider included in the terminal information inquiry request message are not available in the step of S740 and S750, the content provider access unit 310 transmits a message thereof to the content providing unit 150 (S760).

In the case that a data format or an authority of a content provider included in the terminal information inquiry request message are available in the step of S740 and S750, the content provider access unit 310 transmits the terminal information inquiry request message to the terminal information management unit 600 (S770).

The terminal information management unit 600 searches information of a mobile terminal corresponding to the subscriber information (S780).

Herein, the terminal information management unit 600 searches using a service management code corresponding to subscriber information composed of any one of an MIN, an MDN and a client ID. And then the terminal information management unit 600 searches a subscriber information corresponding to the service management code and searches information of a mobile terminal corresponding to the subscriber information at a predetermined database.

In an applied example, an information of a mobile terminal matched with a URI, a user agent and a phone type is stored, and thus the terminal information management unit 600 can search an information of the mobile terminal through the URI, the user agent and the phone type.

If the search is completed, the terminal information management unit 600 transmits the searching result to the content provider access unit 310, generates a respond message corresponding to the terminal information inquiry request message as a predetermined format and then transmits the same to the content providing unit 150 (S790).

Accordingly, a predetermined error message is transmitted to the content providing unit 150 in the case that a subscriber information or information of the mobile terminal don't exist in the searching result.

Information of the mobile terminal includes any one of the hardware of a mobile terminal inputted by a terminal vendor, the software related information stored at an inside of the mobile terminal and a handset platform.

While the invention is susceptible to various modifications and alternative forms, specific embodiments thereof have been shown by way of example in the drawings and are herein description in detail. It should be understood, however, that the description herein of specific embodiments is not intended to limit the invention to the particular forms disclosed, but on the contrary, the invention is to include all modifications, equivalents and alternatives falling within the spirit and scope of the invention as defined by the appended claims.

INDUSTRIAL APPLICABILITY

The present invention provides a user with a content in accordance with an efficiency of a mobile terminal in a mobile communication providing a wireless internet service.

The invention claimed is:

1. A method performed by an apparatus for integrating and managing information of a mobile terminal, the method comprising the steps of:
  A) selecting whether the mobile terminal supports a user agent profile and requesting a registration of the information of the mobile terminal;
  B) deciding an approval on the information of the mobile terminal by identifying content of the information of the mobile terminal;
  C) extracting a subscriber information from a log file generated in the case that the mobile terminal accesses a wireless internet network, comparing the extracted subscriber information with pre-stored data, and updating the subscriber information in accordance with the result of the comparison;
  D) requesting an inquiry about the information of the mobile terminal from a content providing unit based on the subscriber information when the mobile terminal accesses the content providing unit through the wireless internet network; and
  E) transmitting a result of the inquiry about the information of the mobile terminal to the content providing unit,
  wherein the step (A) comprises the steps of:
  A-1a) transmitting a web page for registering the information of the mobile terminal through an operator's terminal;
  A-1b) receiving information concerning whether the mobile terminal supports the user agent profile through the web page by the operator; and
  A-1c) requesting a registration of a pre-generated RDF file.

2. The method according to claim 1, wherein the step (B) comprises the steps of:
- B-1) identifying the content of the information of the mobile terminal by an operator having an authority warranted in accordance with a predetermined regulation;
- B-2) inputting a phone type of the mobile terminal in the case that the mobile terminal doesn't support the user agent profile, and selectively inputting the phone type of the mobile terminal in the case that the mobile terminal supports the user agent profile;
- B-3) deciding the approval on the information of the mobile terminal by the operator.

3. The method according to claim 2, wherein the step (B-1) comprises the steps of:
- B-11) transmitting an attribute list included in RDF file to an operator's terminal in the case that a modification of an attribute of the information of the mobile terminal is requested by the operator;
- B-12) transmitting a schema of the attribute to the operator's terminal in the case that any one of the attribute list is selected; and
- B-13) storing the schema modified by the operator.

4. The method according to claim 3, wherein the information of the mobile terminal is displayed as the RDF file, and the content of the information of the mobile terminal follows a type defined in the schema of the RDF file.

5. The method according to claim 4, wherein the RDF file includes a component and an attribute.

6. The method according to claim 5, wherein the user agent profile, the RDF file and the schema of the attribute are defined in accordance with an OMA (Open Mobile Alliance), and the schema of the component and the attribute are modifiable and deletable by the operator.

7. The method according to claim 2, wherein the step (C) comprises the steps of:
- C-1) receiving the log file generated by accessing the wireless internet network, by the mobile terminal;
- C-2) extracting the subscriber information and the device ID from the log file;
- C-3) discriminating whether the subscriber information exists in a first database managing a subscriber joined a wireless internet service;
- C-4) storing the device ID to a second database by mapping the device ID with the subscriber information in the case that the subscriber information doesn't exist in the first database;
- C-5) inquiring the stored device ID corresponding to the subscriber information in the second database managing the information of the mobile terminal in the case that the subscriber information exists in the first database and;
- C-6) performing the update of the device ID in the case that the device ID stored the second database is not identical to the device ID extracted from the log file.

8. The method according to claim 7, wherein the step (C-2) comprises the steps of:
- C-2i) reading a format of an information field of the mobile terminal from the log file and extracting the device ID from the format of the information field of the mobile terminal; and
- C-2ii) reading a format of an information field of the subscriber from the log file and extracting the device ID from the format of the information field of the mobile terminal in the case that the format of an information field of the subscriber is available.

9. The method according to claim 8, wherein the subscriber is any one of an MIN (Mobile Identification Number), an MDN (Mobile Directory Number) and, a client ID defined in an OMA (Open Mobile Alliance).

10. The method according to claim 7, wherein the log file is periodically received from a web gateway.

11. The method according to claim 1, wherein the step (D) comprises the steps of:
- D-1) receiving a terminal information inquiry request message generated by using the subscriber information of the mobile terminal;
- D-2) discriminating whether the terminal information inquiry request message is available, and transmitting the terminal information inquiry request message to a terminal information management unit managing the information of the mobile terminal in the case that the terminal information inquiry request message is available; and
- D-3) checking the information of the mobile terminal corresponding to the subscriber information in the terminal information management unit.

12. The method according to claim 11, wherein the step (D-3) comprises the steps of:
- D-31) checking the subscriber information corresponding to a service management code in the terminal information management unit; and
- D-32) searching the information of the mobile terminal corresponding to the subscriber information.

13. The method according to claim 12, wherein the subscriber information is generated by substituting any one of a type of the mobile terminal, a user agent defined by the wireless internet network operator, and URI (Unique Resource Identity) defined in an OMA standard.

14. The method according to claim 13, further comprising the step (D-4) of transmitting a predetermined error message to the content providing unit in the case that the subscriber information or the information of the mobile terminal does not exist in the checking result of the two steps (D-31) and (D-32).

15. The method according to claim 14, wherein the information of the mobile terminal is an information related to a hardware of the mobile terminal inputted from a terminal vendor or an information related to a software stored inside of the mobile terminal.

16. The method according to claim 15, wherein the subscriber information is obtained by accessing in a wireless internet system by the mobile terminal or inputting a phone number of the mobile terminal by a user accessing a website.

17. The method according to claim 16, wherein a content provider access unit discriminate an availability of a format of the terminal information inquiry request message and an availability of the content providing unit's authority in the case that an availability of the terminal information inquiry request message is discriminated in the step (D-2).

18. The method according to claim 17, further comprising the step (D-5) of transmitting to the content provider access unit an information in accordance with the checking result, changing the information into a response message having a predetermined format and transmitting the same by the content provider access unit.

19. The method according to claim 18, further comprising the step (D-6) of transmitting a message presenting an unavailability of the terminal information inquiry request message to the mobile terminal of the content providing unit in the case that the terminal information inquiry request message is not available.

20. The method according to claim 1, wherein a device ID is extracted from the log file, the device ID is compared with pre-stored data, and the device ID is updated in accordance with the result of the comparison.

21. The method according to claim 1, wherein the log file is generated from a web gateway and transmitted periodically at a real time in the case the mobile terminal accesses the wireless internet network.

22. The method according to claim 1, further comprising the step of
G) modifying or changing the information of the mobile terminal through an operator's terminal or a web browser of a terminal vendor of the mobile terminal.

23. A method performed by an apparatus for integrating and managing information of a mobile terminal, the method comprising the steps of:
A) selecting whether the mobile terminal supports a user agent profile and requesting a registration of the information of the mobile terminal;
B) deciding an approval on the information of the mobile terminal by identifying content of the information of the mobile terminal;
C) extracting a subscriber information from a log file generated in the case that the mobile terminal accesses a wireless internet network, comparing the extracted subscriber information with pre-stored data, and updating the subscriber information in accordance with the result of the comparison;
D) requesting an inquiry about the information of the mobile terminal from a content providing unit based on the subscriber information when the mobile terminal accesses the content providing unit through the wireless internet network; and
E) transmitting a result of the inquiry about the information of the mobile terminal to the content providing unit,
wherein the step (A) comprises the steps of:
A-2a) transmitting a web page for registering the information of the mobile terminal through a web browser of a terminal vendor of the mobile terminal;
A-2b) inputting information concerning whether the mobile terminal supports the user agent profile through the web page by the terminal vendor; and
A-2c) generating a RDF file to the mobile terminal and requesting a registration of the RDF file.

24. A method performed by an apparatus for integrating and managing information of a mobile terminal, the method comprising the steps of:
A) selecting whether the mobile terminal supports a user agent profile and requesting a registration of the information of the mobile terminal;
B) deciding an approval on the information of the mobile terminal by identifying content of the information of the mobile terminal;
C) extracting a subscriber information from a log file generated in the case that the mobile terminal accesses a wireless internet network, comparing the extracted subscriber information with pre-stored data, and updating the subscriber information in accordance with the result of the comparison;
D) requesting an inquiry about the information of the mobile terminal from a content providing unit based on the subscriber information when the mobile terminal accesses the content providing unit through the wireless internet network; and
E) transmitting a result of the inquiry about the information of the mobile terminal to the content providing unit,
wherein the step (A) comprises the steps of:
A-i) receiving an account generation request message of a terminal vendor for registering the information of the mobile terminal;
A-ii) transmitting a web page for registering the information of the mobile terminal to a terminal of the terminal vendor having the generated account;
A-iii) receiving a registration request message corresponding to the information of the mobile terminal by uploading the information of the mobile terminal through the web page for the terminal vendor; and
A-iv) approving changed account information by an operator and then registering the changed account information in the case that the account information of the terminal vendor is changed by the terminal vendor,
wherein in the step (A-iii), the information of the mobile terminal is uploaded by a RDF file, and the information of the mobile terminal is notified through a short message or e-mail in case of requesting a registration of the information of the mobile terminal.

25. An apparatus for integrating and managing information of a mobile terminal, the apparatus comprising:
a subscriber information detection unit for obtaining a subscriber information of the mobile terminal for which a content is to be provided through a communication network;
a content provider access unit for receiving a terminal information inquiry request message in order to inquire an information of a subscriber's terminal based on the subscriber information and discriminating its availability, and transmitting the received information of the subscriber's terminal to a content providing unit; and
a terminal information management unit for managing a terminal information corresponding to the subscriber information, reading the terminal information and then transmitting the same to the content provider access unit in the case that the terminal information inquiry request message is available,
wherein the terminal information management unit comprises:
a terminal information approval unit for deciding an approval of the terminal information by an operator's authority warranted in accordance with a predetermined regulation concerning a registration request of the terminal information;
an automatic update management unit for extracting the subscriber information and a device ID from a log file generated when the mobile terminal accesses a wireless internet network, comparing the same with pre-stored data, and updating the subscriber information or the device ID in accordance with the result of the comparison; and
a subscriber information-device ID management unit for managing the subscriber information or the device ID updated from the automatic update management unit, checking the information of the mobile terminal requested on the basis of the subscriber information from the content providing unit and then transmitting the device ID to the content providing unit by reading the device ID corresponding to the subscriber information,
wherein the registration request of the terminal information is performed by selecting whether the mobile terminal supports a user agent profile and requesting a registration of a generated RDF file.

26. The apparatus according to claim 25, wherein the RDF file includes a component and an attribute.

27. The apparatus according to claim 25, further comprising a terminal vendor management unit for generating an account in accordance with a request of a terminal vendor of the mobile terminal, and transmitting the information of the mobile terminal updated by the terminal vendor to the terminal information approval unit.

\* \* \* \* \*